(12) United States Patent
Chapman

(10) Patent No.: US 6,217,236 B1
(45) Date of Patent: Apr. 17, 2001

(54) CAMERA CRANE ARM

(75) Inventor: Leonard T. Chapman, North Hollywood, CA (US)

(73) Assignee: Chapman/Leonard Studio Equipment, North Hollywood, CA (US)

( * ) Notice: Subject to any disclaimer, the term of this patent is extended or adjusted under 35 U.S.C. 154(b) by 0 days.

(21) Appl. No.: 09/412,010

(22) Filed: Oct. 4, 1999

Related U.S. Application Data

(60) Continuation-in-part of application No. 09/092,194, filed on Jun. 5, 1998, now Pat. No. 5,984,536, which is a division of application No. 08/514,831, filed on Aug. 14, 1995, now Pat. No. 5,781,814.

(51) Int. Cl.[7] .................................................. G03B 17/00
(52) U.S. Cl. ........................................ 396/428; 248/187.1
(58) Field of Search ..................... 396/419, 420, 396/421, 422, 428; 248/187.1; 312/242

(56) References Cited

U.S. PATENT DOCUMENTS

| | | | |
|---|---|---|---|
| 2,291,014 | 7/1942 | Woodu | 403/13 |
| 4,621,785 * | 11/1986 | Embra | 396/419 |
| 4,621,786 * | 11/1986 | Greenlee | 396/13 |
| 4,657,220 * | 4/1987 | Lindsay | 352/243 |
| 4,849,778 * | 7/1989 | Samuelson | 396/428 |
| 4,870,440 * | 9/1989 | Frost | 396/428 |
| 5,054,725 | 10/1991 | Bucefari | 352/243 |
| 5,064,062 * | 11/1991 | Miller | 206/316.2 |
| 5,177,516 | 1/1993 | Fitz et al. | 396/428 |
| 5,192,963 | 3/1993 | Hill | 396/428 |
| 5,243,370 * | 9/1993 | Slater | 352/243 |
| 5,361,567 | 11/1994 | Ulschmid et al. | 403/114 |
| 5,531,412 | 7/1996 | Ho | 396/428 |
| 5,908,181 * | 6/1999 | Valles-Navarro | 396/428 |
| 5,940,645 * | 8/1999 | Bonin | 396/428 |

OTHER PUBLICATIONS

The HY HY Crane Arm Base brochure, Leonard Studio Equipment, Inc. (1993) ( No Month).
The Lenny Arm II by Chapman brochure, Leonard Studio Equipment, Inc. (1994) (No Month).
Egripment Piccolo brochure, Egripment U.S.A. Inc. (No Date).
The Lenny Arm by Chapman brochure, Leonard Studio Equipment, Inc. (1992) (No Month).

* cited by examiner

*Primary Examiner*—David M. Gray
(74) *Attorney, Agent, or Firm*—Lyon & Lyon LLP

(57) ABSTRACT

A camera crane arm has a frame pivotally supporting a central beam section. Outer beam sections are attached to and spaced apart from the central beam section. A leveling system is externally attached to the frame and pivotally linked to a camera platform, to maintain the platform in a level orientation, as the crane arm is pivoted up and down, to adjust camera lens height. The crane arm is formed of sections having vertically offset ends, to reduce sagging. The sections have a high moment of inertia but low weight, and can be assembled without force.

8 Claims, 8 Drawing Sheets

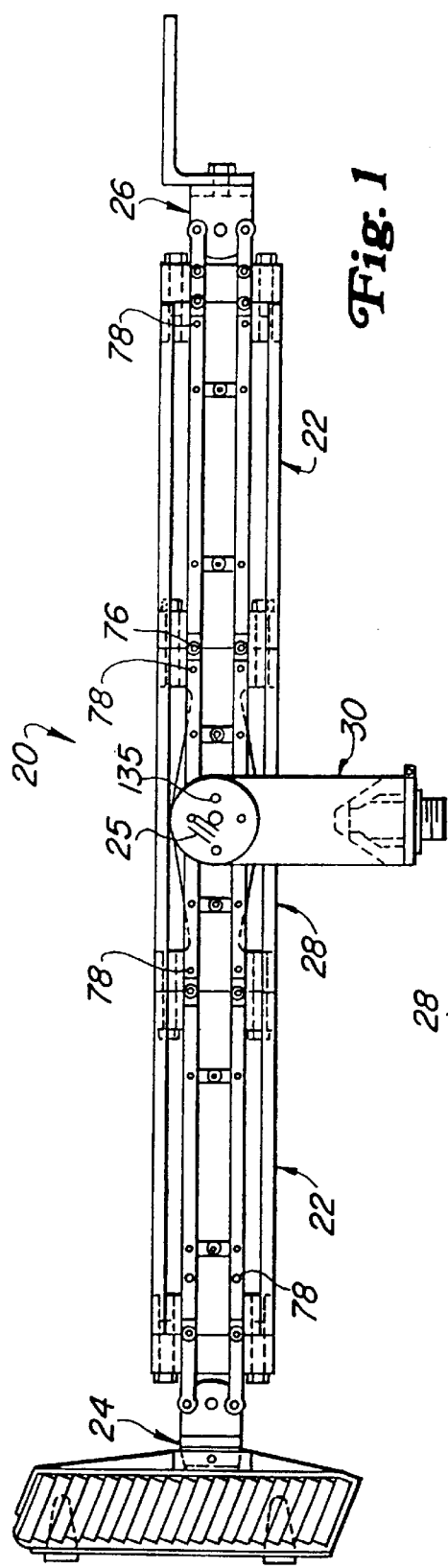
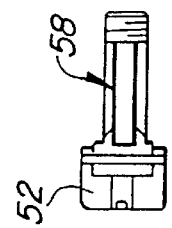
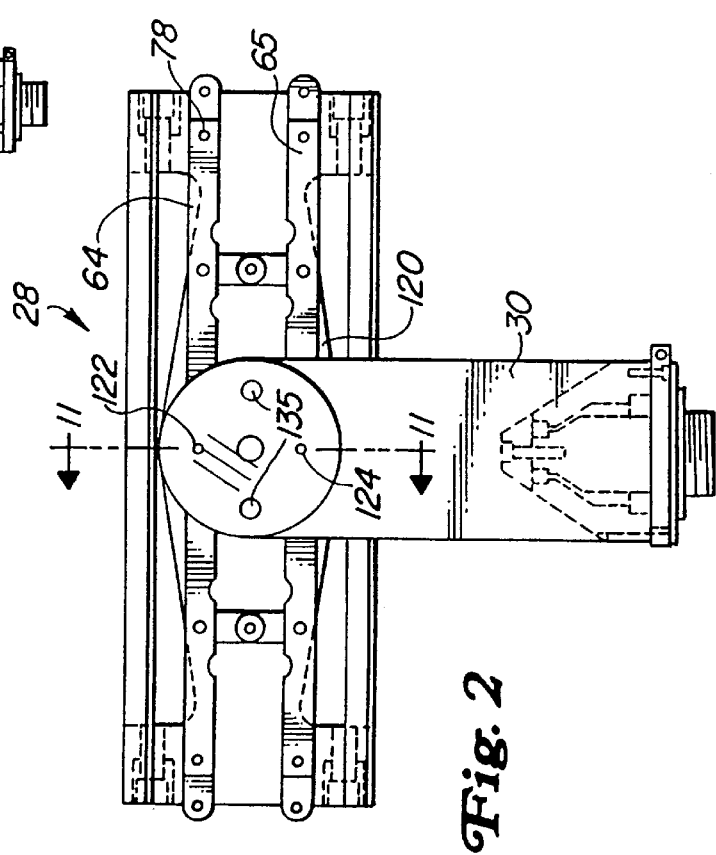

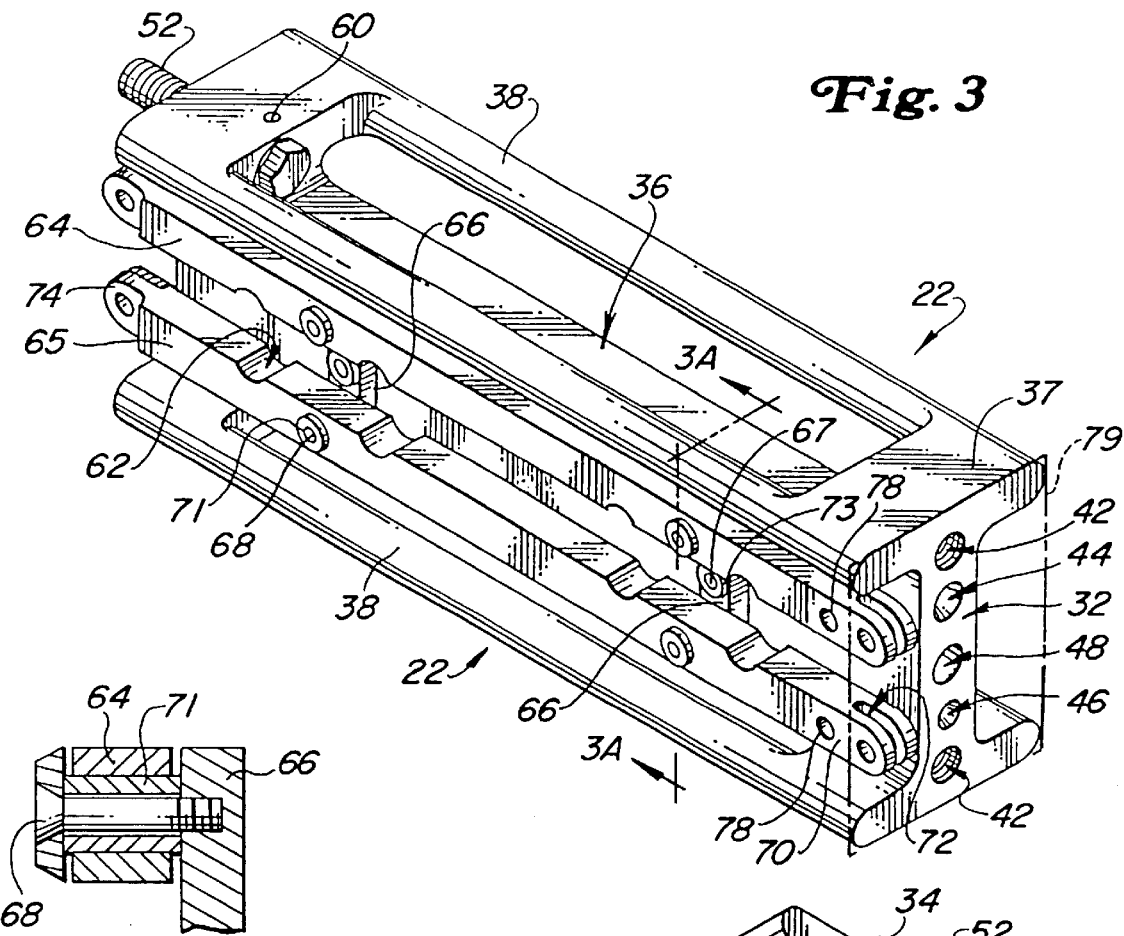
Fig. 3
Fig. 3A
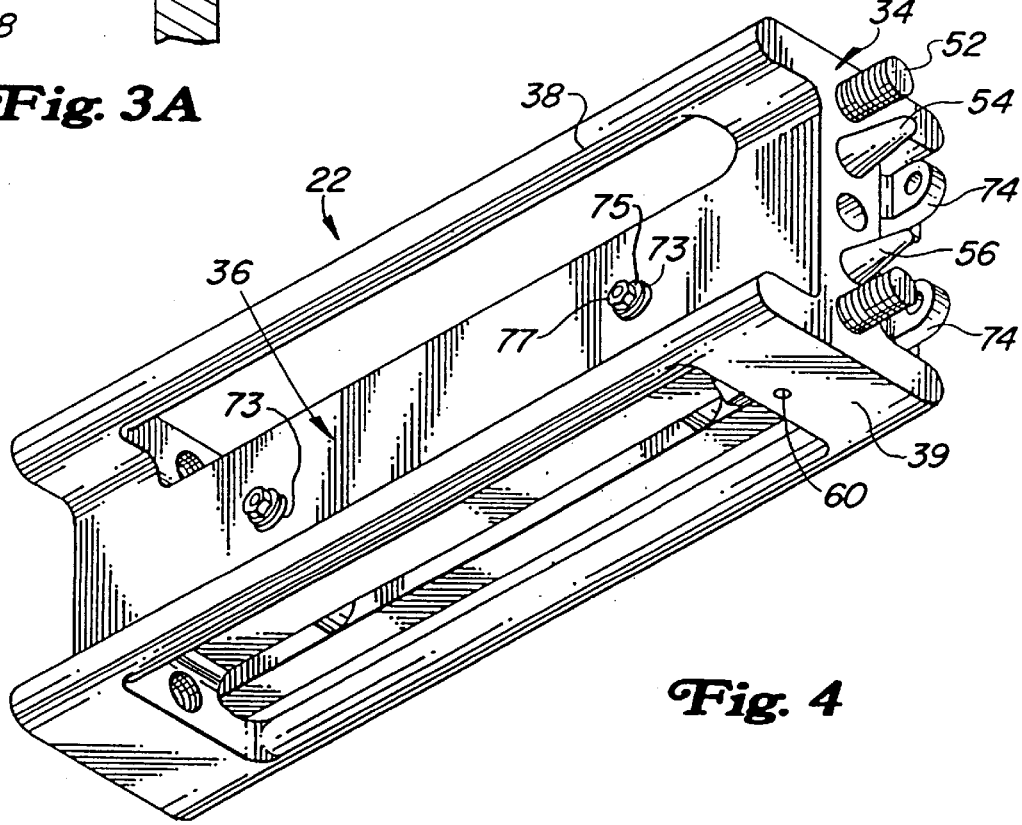
Fig. 4

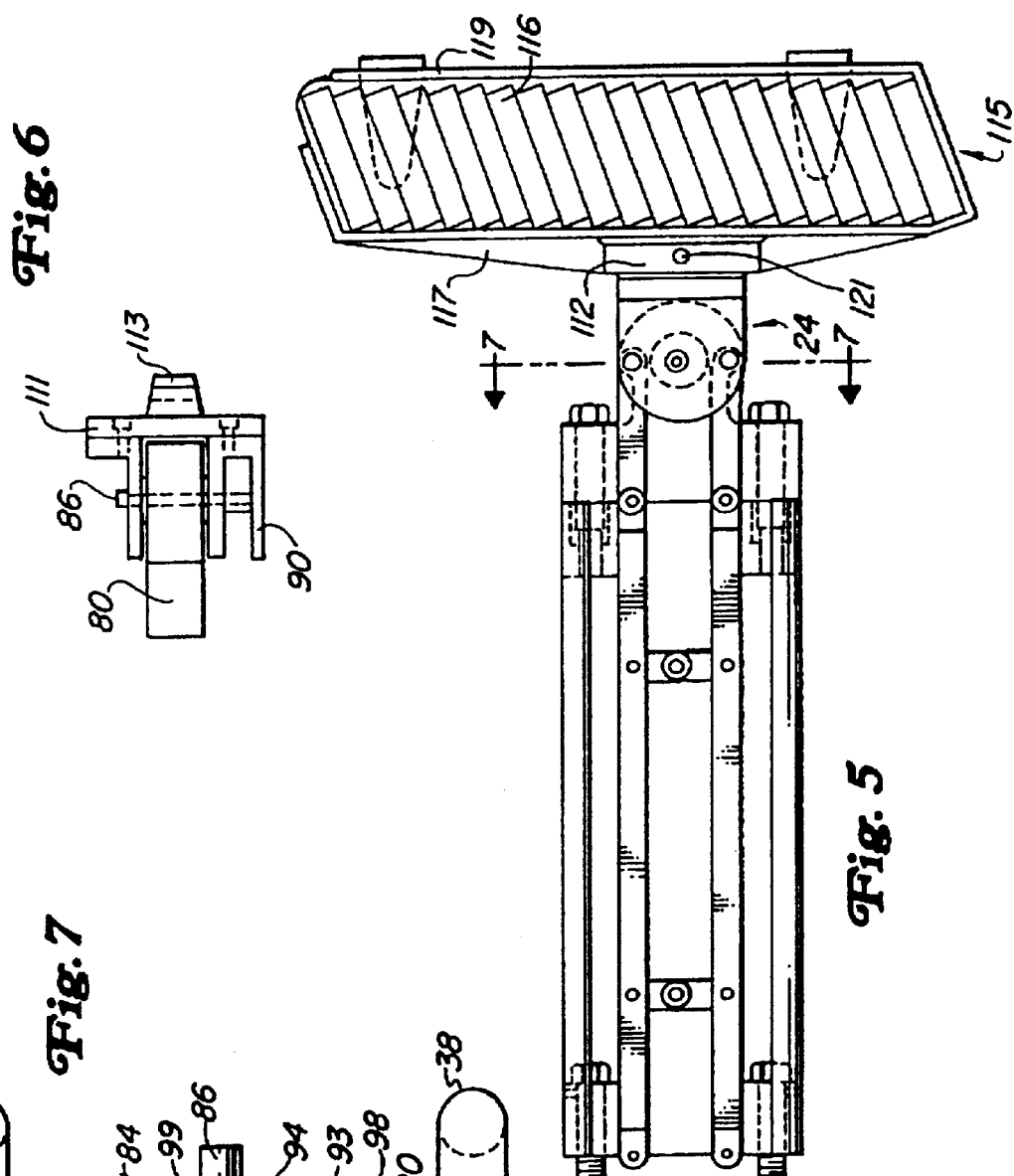
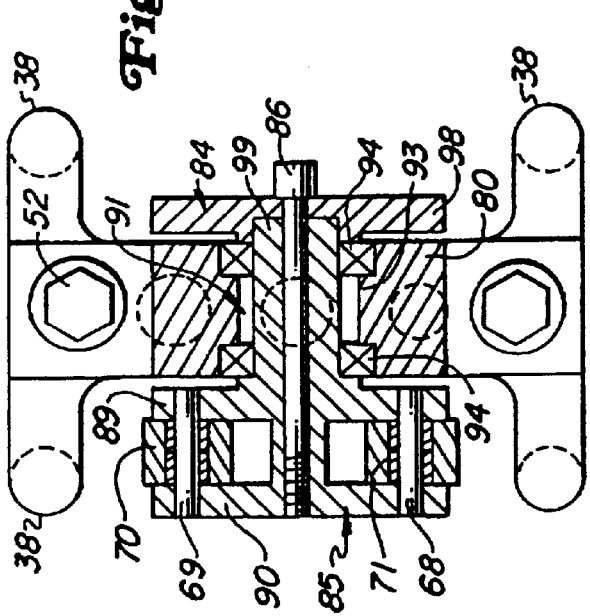

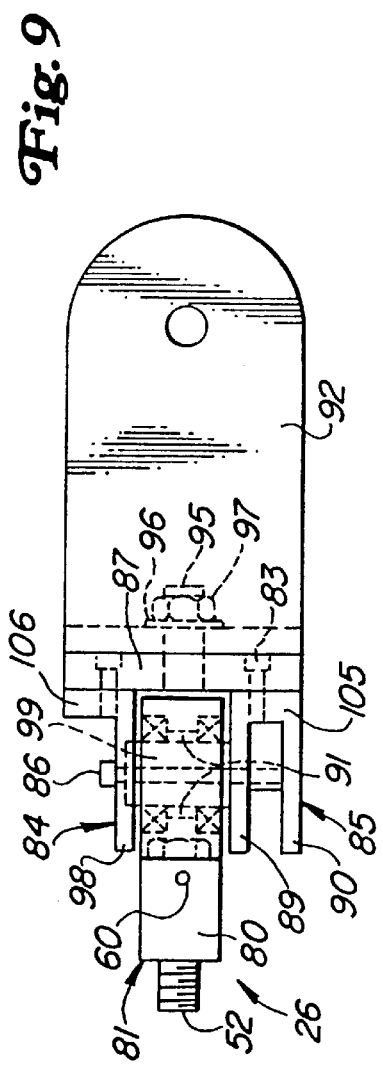
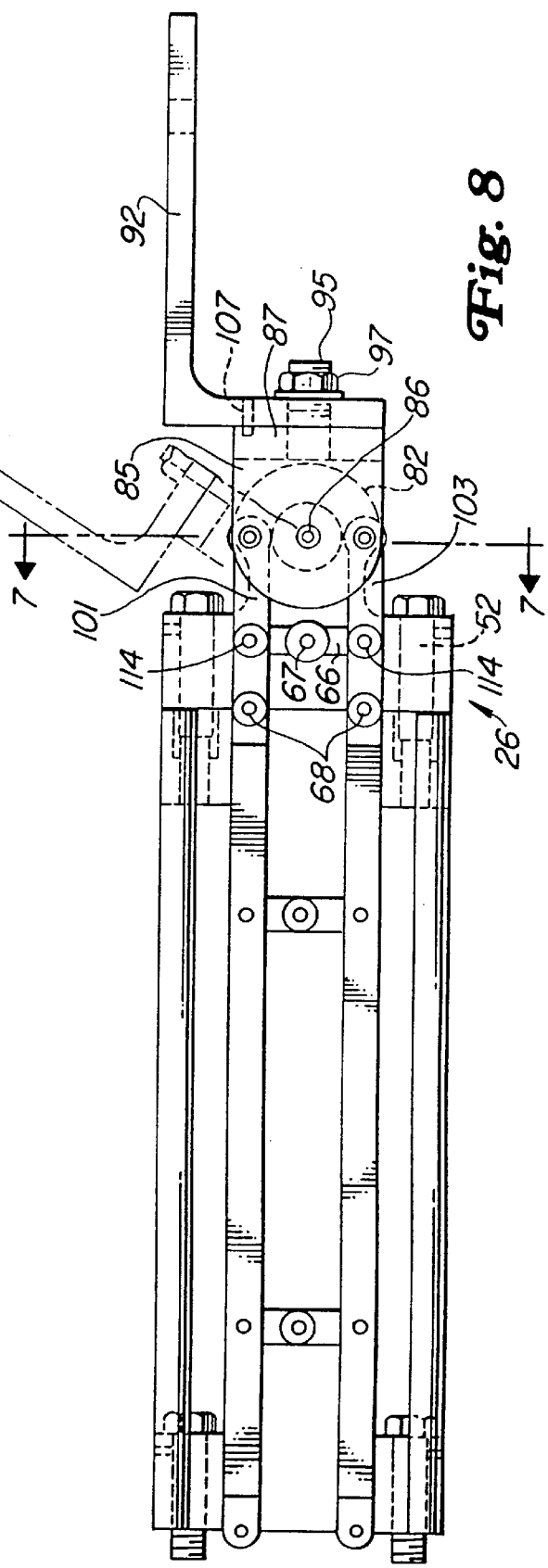

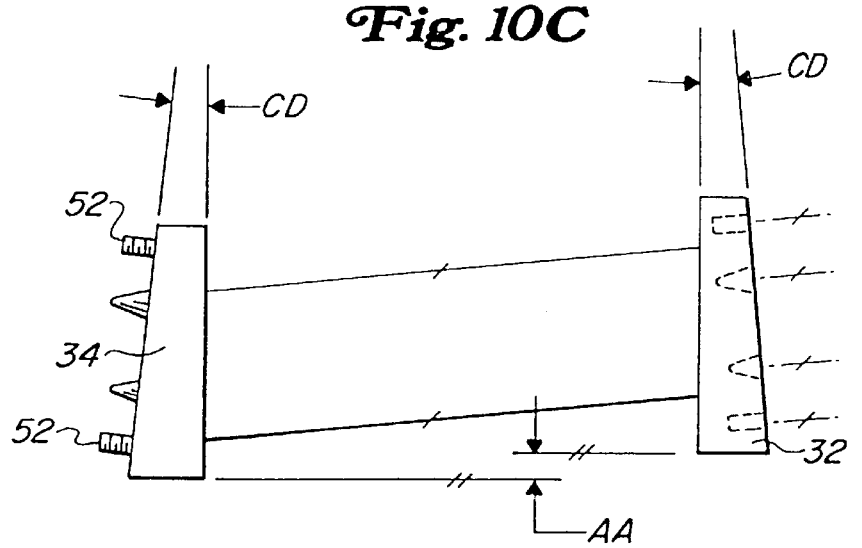
Fig. 10C
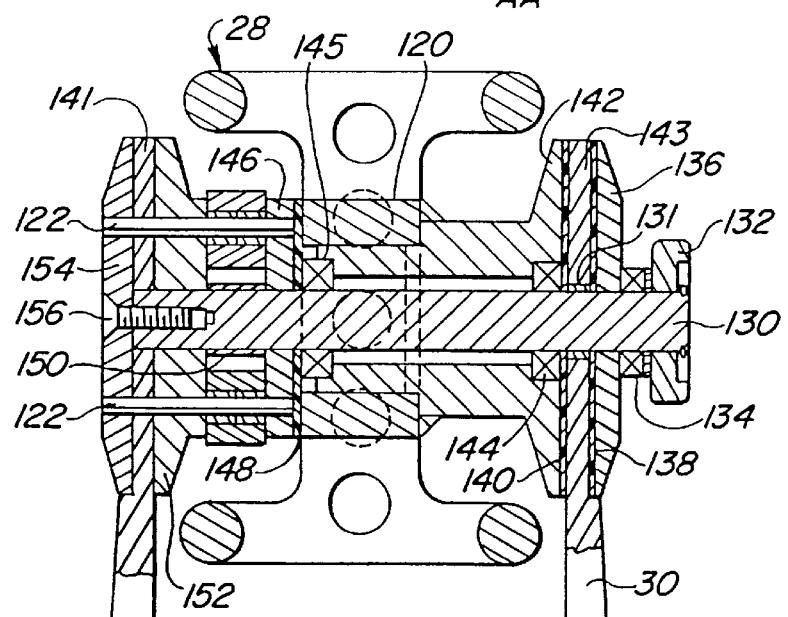
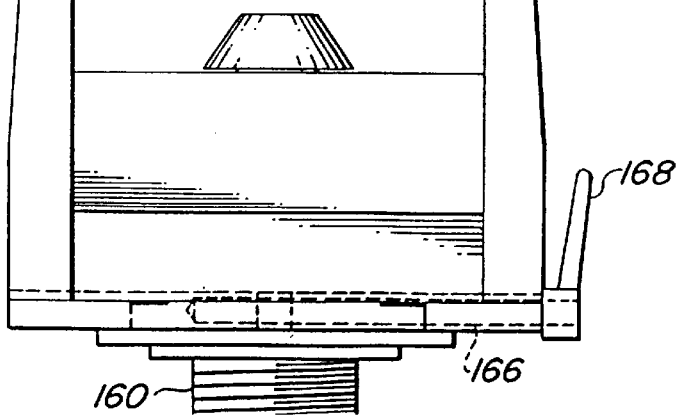
Fig. 11

US 6,217,236 B1

CAMERA CRANE ARM

This application is a continuation-in-part of Ser. No. 09/092,194, filed Jun. 5, 1998, now U.S. Pat. No. 5,984,536, which in turn is a divisional of Ser. No. 08/514,831, filed Aug. 14, 1995, now U.S. Pat. No. 5,781,814.

BACKGROUND OF THE INVENTION

Camera cranes are often used in the motion picture and television industries to position and maneuver cameras. Camera cranes typically have a crane arm supported on a base, with a camera platform at one end of the arm, and a counterweight at the other end. The crane arm can be pivoted by hand to raise and lower the camera, and also to pan to the left or right side. A leveling system is often included to maintain the camera platform in a level orientation.

With the advent of remote controlled television and motion picture cameras, filming can be achieved without a camera operator sitting behind the camera. Rather, the camera operator can remain on the ground while the remotely controlled camera is suspended on a crane arm. This allows for more versatile camera positioning. For example, the remotely controlled camera can be positioned at locations where it would be too time consuming, difficult or dangerous to place a traditional camera and operator. Accordingly, there is a need for camera crane arms to match the versatility of remote camera systems.

Due to the variety, and occasionally difficult accessibility of filming locations, the camera crane arm should advantageously be portable and lightweight. On the other hand, the arm must be rigid enough, when assembled, to resist bending and sagging, and to avoid excessive whipping motion on the camera during movement. While various camera crane arms have been used successfully in the past, there remains a need for an improved camera crane arm to meet the needs of the television and motion picture industries.

SUMMARY OF THE INVENTION

To these ends, in a first aspect, a camera crane arm preferably includes a frame pivotally supporting a central box section. A plurality of outer beams are attached to and spaced apart from the central box section. A leveling system is advantageously fixed to the box section in between outer beams, and pivotally linked to a camera platform, to maintain the platform in a level orientation.

In a second aspect, the crane arm is most desirably formed of sections having substantially flat ends, with a first end having one or more tapered pin and the second end having a like number of mating tapered holes, with the pins and holes of adjacent sections configured to engage each other when the flat ends of adjacent sections are brought together, thereby forming a secure and rigid attachment between sections.

In a third aspect, the beam sections have inclined end faces, to reduce sagging of the arm.

In a fourth aspect, the The camera platform is attached to the crane arm at a preset incline angle, to compensate for deflections when loaded.

BRIEF DESCRIPTION OF THE DRAWINGS

In the drawings, wherein similar reference characters denote similar elements throughout the several views:

FIG. 1 is a side elevation view of a preferred embodiment of the present camera crane arm;

FIG. 2 is an enlarged side elevation view showing the frame section of the crane arm of FIG. 1;

FIG. 3 is a top and left side isometric view of a preferred crane arm section;

FIG. 3A is a partial section view taken along line 3A—3A of FIG. 3;

FIG. 4 is a bottom and right side isometric view of the section of FIG. 3;

FIG. 5 is a side elevation view of the back end of the crane arm of FIG. 1;

FIG. 6 is a partial plan view thereof;

FIG. 7 is a section view taken along line 7—7 of FIG. 8;

FIG. 8 is a side elevation view of the front end of the camera crane arm of FIG. 1;

FIG. 9 is a partial plan view thereof;

FIG. 10C is a geometric construction similar to FIG. 10B and showing an alternative embodiment.

FIG. 11 is a partial section view taken along line 11—11 of FIG. 2;

DETAILED DESCRIPTION OF THE PREFERRED EMBODIMENTS

Figure 10A:
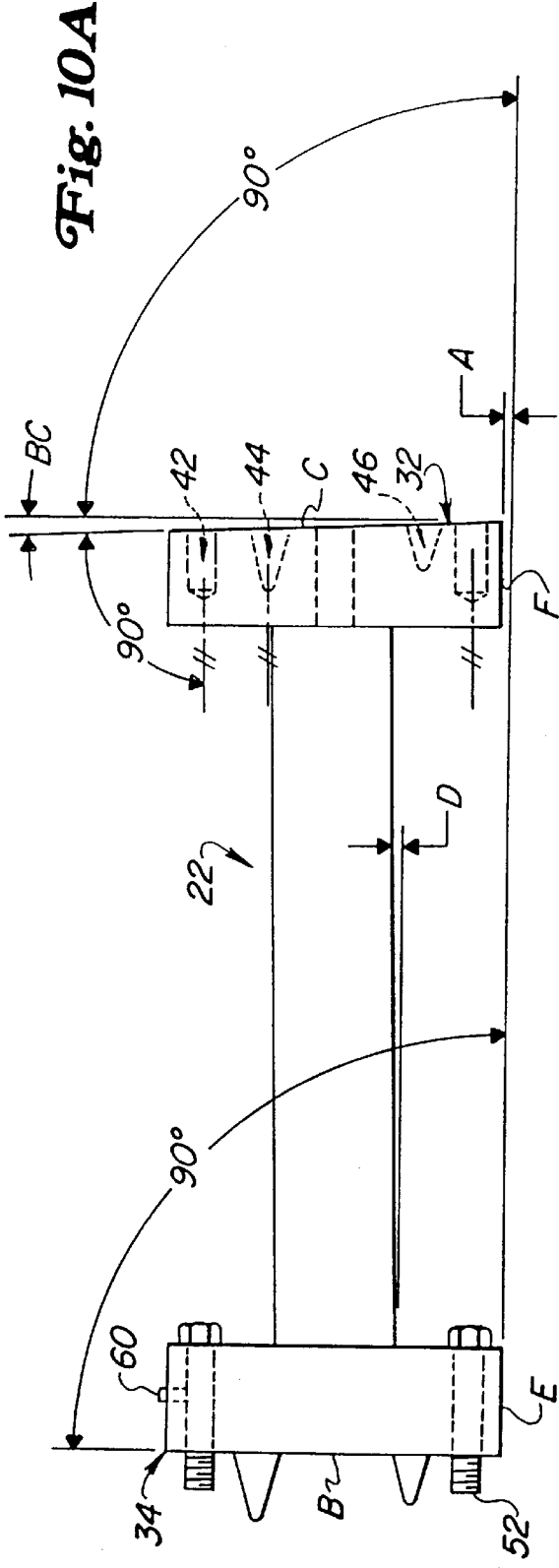
FIG. 10A is a partial schematic illustration of an arm section, as shown in FIGS. 3 and 4.

Turning now in detail to the drawings, as shown in FIG. 1, the present crane arm 20 includes arm sections 22, a counterweight section 24, a nose or camera platform section 26, and a central frame section 28, supported on a frame 30. The embodiment shown in FIG. 1 includes two arm sections 22 on either side of the frame section 28, with the arm sections preferably about 24 inches long. Of course, various numbers of arm sections 22 may be used, and the lengths of the arm sections may be varied. Preferably, arm sections are provided in 12 and 24 inch lengths.

FIG. 2 shows the central frame section 28 on the frame 30, without any arm sections 22. A nose section 26 and a counterweight section 24 may be attached directly to the central frame section 28, to form the shortest embodiment.

As shown in FIGS. 3 and 4, each arm section 22 includes a female end 32 and a male end 34. The section ends are preferably flat, so that with the sections fitted together, the ends fit flush all around. Each arm section 22 includes outer beams 38 joined to a central box section 36, with the arm sections having a substantially I-shaped cross section. The box section 36 is preferably hollow, to reduce weight. The arm sections may be manufactured as aluminum weldments. The upper and lower surfaces 37 and 39 are preferably flat.

The female end 32 includes threaded holes 42 closest to the upper and lower surfaces 37 and 39. A center hole 48 optionally extends centrally into the box section 36, to reduce the weight of the arm section 22 and to allow for cable routing within the arm 20. Pin receiving holes 44 and 46 are advantageously located on opposite sides of the center hole 48, as shown in FIG. 3. Referring to FIG. 4, bolts 52 are provided at the male end 34 of the arm sections 22, in alignment with the threaded holes 42, when adjacent sections are mated together. Upper and lower pins 54 and 56 extend from the flat face of the male end 34, similarly in alignment with the holes 44 and 46. The pins 54 and 56 advantageously have different diameters, so that the arm sections 22 cannot be assembled in a reversed or upside down manner. In the embodiment shown, the upper pin 54 is larger than the lower pin 56, with the upper pin having a base diameter of 1 inch and tapering at a 6° included angle to a substantially smaller end diameter, and with the lower pin 56 having a base diameter of ¾ inch and similarly tapering to a substantially smaller end diameter. The pin receiving holes 44 and 46 are also tapered and configured to engage with the pins 54 and 56 as the male end 34 of one arm section engages a female end 32 of an adjacent section. Because of the taper of the pins 54 and 56, no engagement force is needed to assemble adjacent arm sections 22, i.e., the attachment is engagement free until the flat facing surfaces meet.

Referring to FIG. 2A, an undercut 58 is provided to the root diameter on a section of the threads of the bolts 52. Once installed, the bolts 52 are captive within the arm sections 22 by set screws 60, (FIG. 3) which allow the bolts 52 to turn, and slide forward and back, but prevent the bolts 52 from being removed from the arm section.

Referring still to FIG. 3, each arm section 22 includes upper and lower leveling rods 64 and 65. The ends of the leveling rods at the female end of the arm section 22 have a clevis 70 including a slot 72. Correspondingly, the ends of the leveling rods 64 at the male end 34 of each arm section 22 include tabs 74, which mate into the slots 72 (of an adjacent arm section 22). The leveling rods 64 are mounted on bolts 68 extending through bushings 71, with the bolts threaded into pivot arms 66. The bushings 71, preferably stainless steel, are slightly wider than the leveling rods, so that the bolts 68 clamp down on the bushings 71, but not on the leveling rods, which remain free to pivot on the bushings 71. The pivot arms are similarly mounted on bolts 67 passing through bushings 73 slip fit into, and slightly wider than, the box section 36 and retained by washer 77 and nut 75, so that the pivot arms 66 can freely pivot with respect to the box section 36. Referring momentarily to FIG. 1, quick release pins placed through holes in the clevis 70 and slot 72 at the ends of the leveling rods 64 and 65 allow the leveling rods of adjacent arm sections to be securely attached to each other. Storage holes 78 may be provided through the leveling rods at the female ends, to conveniently store the quick release pins 76 when not in use. The leveling rods are external on the arm 20, yet are within the envelope 79 of the cross section of the arm. Accordingly, they are easily and quickly accessible for assembly and disassembly of the arm, yet they are shielded from damage via dropping, collision, etc.

The lower surface of the upper leveling rod 64, and the upper surface of the lower leveling rod 65 include recesses 62, to allow a greater range of movement, without interference from the pins 67 or needle bearings 71.

Turning to FIGS. 7, 8 and 9, the nose section 26 includes an armature 80 having a flat rear surface male end 81 similar to the arm sections 22 (but without the outer beams). The armature has a round forward end 82 with flat sides and a through bore 91 having a central step 93. A U-plate 85 has inner and outer disk legs 89 and 90, a flat forward plate 105, and a shaft section 99. The shaft section 99 extends through the bore and bearings 94 in the bore. An L-plate 84 has a disk leg 98 joined at a right angle to a forward plate 106. As shown in FIG. 7, the end of the shaft section 99 is supported in a counterbore in the disk leg 98. A bolt 86 extends through the L plate 84 and shaft section 99 and threads into disk leg 90. Bolts 83 attach the forward plates 105 and 106 to an attaching plate 87. A nose plate 92 is attached to the attaching plate 87 via a stud 95 extending from the attaching plate through the vertical leg of the nose plate 92, and a washer 96 and a nut 97 on the stud 95. The front ends of the nose leveling rods 101 and 103 are pivotally attached via dowels and bearings to the U-shaped plate 85 between the disk legs 89 and 90.

Dowel pin 107 locates plate 92 every 90 degrees, as the plate 92 is relocated by revolving around stud 95. The nut 97 is loosened ¼ inch, then plate 92 is moved out ¼ inch, allowing dowel 107 to be rotated in 90 degree increments around stud 95. The incremental rotation change may also of course be set at 45°, 30°, or other angles, as the need may require.

Referring to FIGS. 5 and 6, the counterweight section 24 includes a bucket mounting plate 111 having a pyramid-like trapezoidal mounting lug 113. A weight bucket or cage 115 advantageously has a chassis 117 for holding counterweights 116, which can be secured by a door 119 hinged onto the chassis 117. A chassis receptacle 112 having a trapezoidal slot is provided on the chassis 117, so that the chassis 117 of the weight bucket 115 can be engaged onto the mounting plate 111. A quick release pin 114 extends through aligned holes in the mounting lug 113 and chassis 117, to secure the weight bucket 115 onto the arm 20 while allowing for rapid weight bucket installation and removal. The pyramid lug and slot, each having four angled sides, are self-aligning. Alternative weight bucket designs may also be used. For example, the weight bucket may be split into two smaller spaced apart weight buckets, with a television monitor positioned in between them, along with controls for directing a remote camera.

Referring to FIG. 10A, a 24 inch arm section 22 is provided with an angled end face, to help compensate for vertical deflection of the crane arm. Specifically, when assembled, the female end 32 of the arm section 22 is offset vertically above the male end 34. The male end face is vertical, while the female end face is inclined (upwardly) toward the male end face by angle BC, preferably about 0.5 degrees. This 0.5 degree angle on the end face creates a rise of about 0.2 inches over a 24 inch arm segment. The threaded bolt holes 42 and pin holes 44 and 46 are (as well as the bolts and pins) preferably perpendicular to surfaces B and C.

Figure 10B:
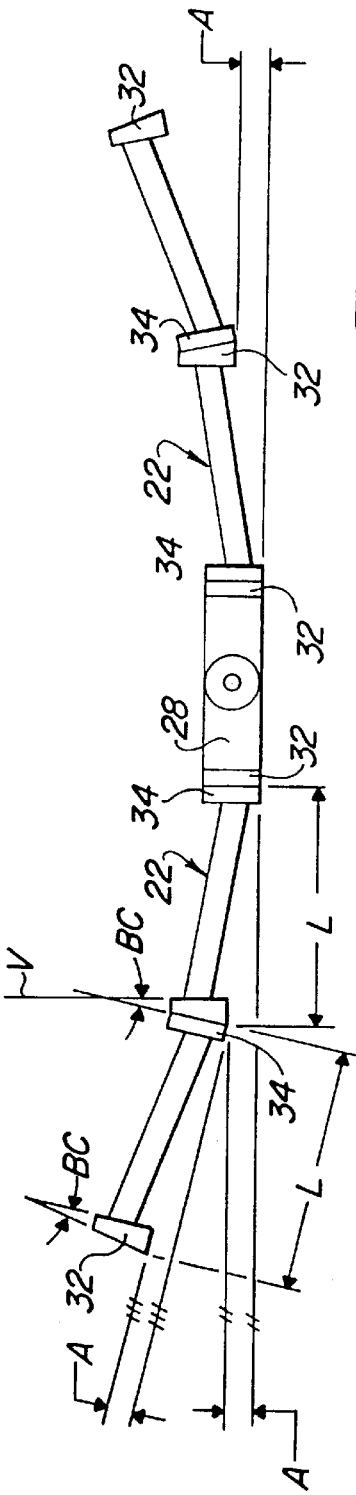
FIG. 10B is a geometric construction better illustrating the offset and angles of the arm section of FIG. 10A.

FIG. 10B schematically shows an unloaded assembly of the section shown in FIG. 10A, with the vertical positions and angles greatly exaggerated for clarity of illustration. The two female ends of the frame section 28 are preferably vertical. The faces of the female ends 32 on the two sections 22 adjoining the frame section 28 are inclined upwardly at an angle BC, preferably about 0.5 degrees for the embodiment shown. As additional sections 22 are added for a longer arm 20, the angles BC, and rises provided by the angles BC, accumulate. Without any load, the ends of the beam are slightly above the frame section 28. However, when loaded with a camera on the nose plate 92 and counterweights in the weight bucket 115, the ends of the beam deflect downwardly, so that the arm 20 is substantially straight and the nose plate 92 is substantially level. When loaded under ordinary conditions, surfaces B and C become substantially parallel and angle BC becomes substantially zero, i.e., the end faces become vertical, as a result of bending deflection of each section 22.

In an alternative embodiment shown in FIG. 10C, the angle BC is split equally on the male and female ends 32 and 34, with each end having an end face angle CD of about 0.25 degrees. The two female end faces 32 of the frame section 28 may also be similarly angled upwardly.

Of course, the amount of end face angle on each arm section 22 required to have the crane arm 20 remain straight without sagging when under load, will vary with the length of the arm 20 (i.e., on how many arm sections 22 are used), the loads applied, and the moment of inertia of the arm 20). Although as arm length increases, the cumulative offset provided with each section also increases, arm deflection will vary with the cube of the length of the arm, whereas the built-in offset or rises of the arm sections accumulates linearly with increasing length. The maximum preferred arm length, measured from the center post 160 to the bearings 94 in the nose section, is about 26 feet, for best performance. The approximate 0.5 degree inclination angle, and 0.2 inch rise per segment for the embodiment of FIG. 10A, are selected to provide a straight beam 20 with a camera payload of about 100–180 pounds, with close to the maximum arm length.

Referring to FIGS. 1 and 2, the frame section 28 has two female ends. Accordingly, the male ends 34 of the arm sections 22 are engaged into both sides of the frame section 28, so that the built-in offset of the arm 20, on either side of the frame section 28 is in the upward direction.

Referring to FIGS. 2 and 11, the frame section 28 includes a box section 120, similar to box section 36, but tapering outwardly towards the center of the frame section 28. The slash lines 25 in FIG. 2 schematically illustrate the position of the leveling rods when the arm is titled fully up. Referring specifically to FIG. 11, a tilt axle 130 extends through a right cap 136, a right spindle 142, the box section 120, a left spindle 152, and is held in place by an axle bolt 156 passing through a left cap 154. Inner and outer washers 138 and 140 separate the right cap 136 and right spindle 142 from the right upper arm 143 of the U-shaped frame 30. A tilt brake knob 132 is attached to the tilt axle 130 and spaced apart from the right cap by a thrust bearing 134. The right spindle 142 is attached, preferably welded, to the box section 120. A spindle bearing 144 and a box section bearing 145 pivotally support the frame section 28 on the tilt axle 130. The tilt axle 130 is fixed on the frame 30. DU bushing 131 allows sliding adjustment when the tilt brake knob 132 is rotated on the O.D. threaded end of axle 130. The frame section 28 of the arm 20 rotates about axle 130.

A disk washer 148 separates the left side of the box section 120 from a leveling rod disk 146. The washers 138, 140 and 148 are preferably Teflon or Delrin or a similar material. A spacer tube 150 around the axle 130 maintains spacing between the left spindle 152 and the leveling rod disk 146, so that the leveling rods cannot become clamped between the left spindle 152 and the disk 146, as the arm pivots vertically to raise and lower a camera. Preferably, the leveling rod disk 146, the spacer tube 150, and the left spindle are machined from a single bar, leaving them connected for added rigidity and strength. As shown in FIG. 2, clamping bolts 135 are advantageously provided to clamp the left cap 154 and spindle 152 to the frame 30.

Upper and lower leveling rod pins 122 extend through the left cap 154 and left spindle 152, through holes in the upper and lower leveling rods 64 and 65 on the frame section 28, and into the leveling rod disk 48. Thus, the left spindle 152, leveling rods 64 and 65, and leveling rod disk 146 are fixed in position on the left upper arm 141 of the frame 30. Bearings may be provided to reduce friction between the pins 122 and the leveling rods, as they pivot about the pins. The pins 122 fix the center of rotation of the leveling rods, causing the ends of the leveling rods to remain vertically aligned, despite vertical pivoting arm movement.

Figure 12:
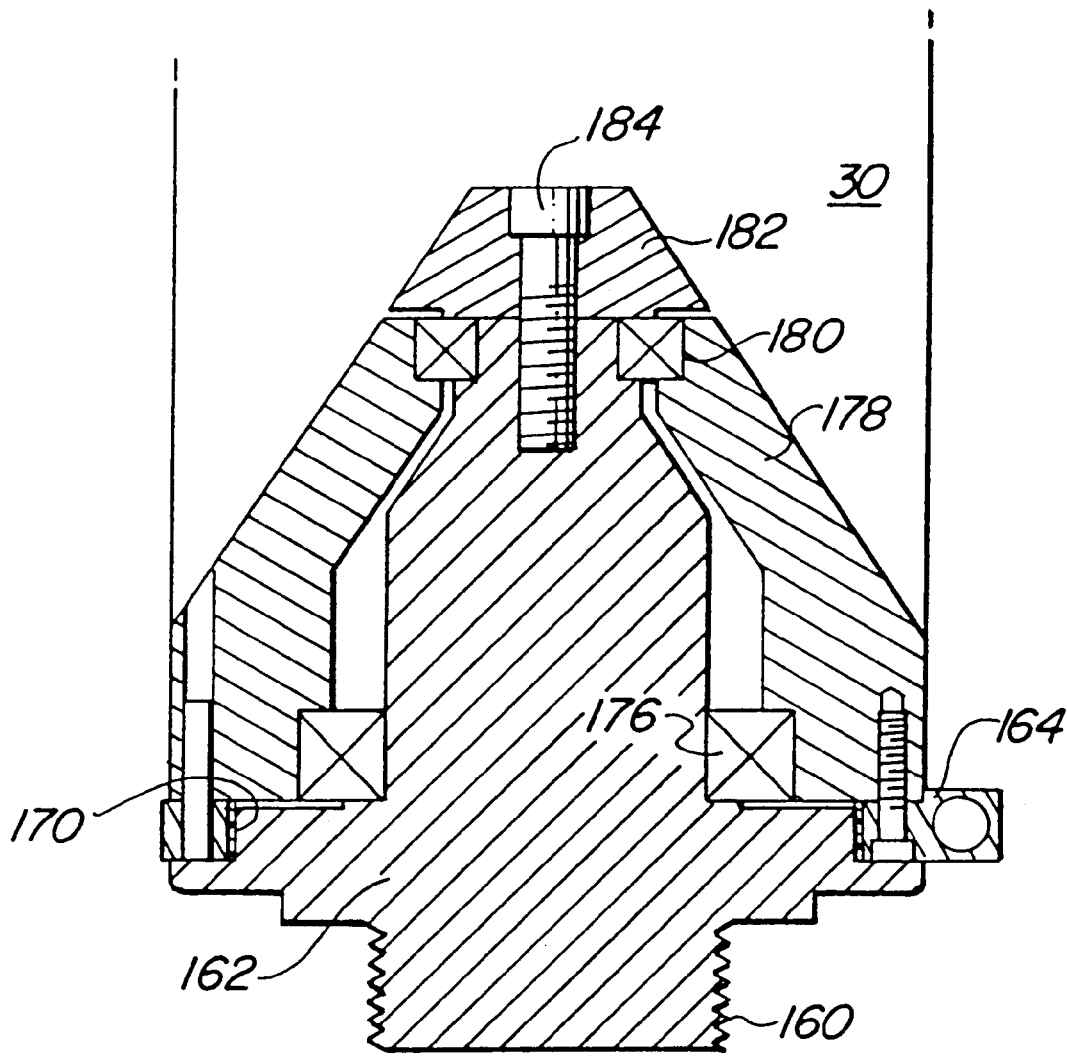
FIG. 12 is a side elevation view of the supporting frame shown in FIGS. 1 and 11.

Turning to FIG. 12, a center post 160 is rigidly attached to a camera dolly or crane arm base, such as shown in my U.S. Pat. No. 4,360,187 or U.S. Pat. No. 5,312,121, incorporated herein by reference, so that the arm 20 has a mobile base which can preferably be moved into different positions on a floor, track or other surface. A Teflon ring 170 around a base 162 is clamped by a split ring 164. Referring to FIG. 11, a pan brake handle 168 is attached to a pan brake bolt 166 which extends through the split ring 164. As the pan brake handle 168 is turned, the sides of the split ring 164 are pulled together and clamp onto the base 162, to stop panning rotation movement.

The frame 30 and base 162 are pivotally supported on the center post 160 via upper and lower center bearings 180 and 176. A frame ring 178 and post cap 182 secure the upper center bearing 180. A post cap bolt 184 holds the frame ring 178 and the frame 30 down onto the center post 160.

In use, the frame 30 carrying the frame section 28, as shown in FIG. 2, is bolted onto a center post 160 of a dolly or mobile base via the post cap bolt 184. Alternatively, if the frame 30 is provided with a center post 160, as shown in FIGS. 2 and 12, then the center post 160 is securely attached to the dolly or mobile base. The appropriate number of arms sections 22 are then fitted together on either side of the frame 30, to achieve the desired arm length. Specifically, the pins 54 and 56 are aligned with and moved into the holes 44 and 46, with adjoining sections moved together until the flat ends touch. The bolts 52 are then turned in to hold adjoining sections together. Due to the flat end surfaces, matching pin and hole contours, and precise machining, even tightening the bolts 52 by hand provides for a rigid arm 20. However, tightening the bolts 52 with a wrench prevents the bolts from becoming inadvertently loosened. As the frame sections are brought together, the holes in the leveling arm clevis 70 and tab 74 align with each other. Locking pins 114 are inserted through the holes, to securely link the upper and lower leveling rods 64 and 65 of adjoining arm sections 22, as shown in FIG. 1. The attachment of arm sections 22 to the frame section 28 is achieved in a similar way, except that the frame section 28 has two female ends. The weight bucket and nose section are attached at opposite ends, in a similar manner. Weights are placed into the weight bucket to balance the arm.

In a preferred embodiment, with the arm sections having a height of about 8.2 inches, a width of about 6 inches, a box section wall thickness of about ¼ of an inch, and a moment of inertia I of about 44 inches$^4$, each 24 inch arm section weighs about 22 pounds. The arm 20 can therefore be readily assembled by attaching the arm sections to the frame section supported on a dolly or mobile base. Alternatively, multiple sections can first be attached together and then attached to the frame section 28, although this requires the lifting of greater weight. The outer beams 38 serve as handles for lifting and maneuvering individual arm sections 28, as well as maneuvering the entire arm 20 during filming.

The leveling system is next to the box section and in between the left side outer beams. In this position, the leveling system (i.e., the leveling rods and their supports and attachments) is shielded from damage and abuse (e.g., dropping arm sections), allows for a more compact design, and is out of the way during use. In addition, as the leveling system is well inside of the envelope 79, the outer beams may be grasped and used as handles away from any potential pinch points.

To lock the arm 20 against vertical movement (i.e., pivoting movement about the tilt axle 130, the tilt brake knob 132 is turned, causing the tilt axle 130 to act as a draw bar and being secured by the axle bolt 156. Correspondingly, the upper arms 141 and 143 of the frame 130 are moved slightly towards each other, clamping the right spindle 142 against the inner Teflon washer 140 and the upper arm 143, and at the same clamping the left side of the box section 120 against the disk washer 148 and the leveling rod disk 146, to the point where friction smoothly resists pivoting movement. When the tilt brake knob 132 is backed off, the clamping force on the frame section 28 is released and the low friction washers 138, 140, and 148 allow the beam 20 to freely pivot vertically. To prevent panning motion, the pan brake handle 168 is similarly tightened, drawing the split ring 164 together and clamping it on the base 162.

Figure 13:
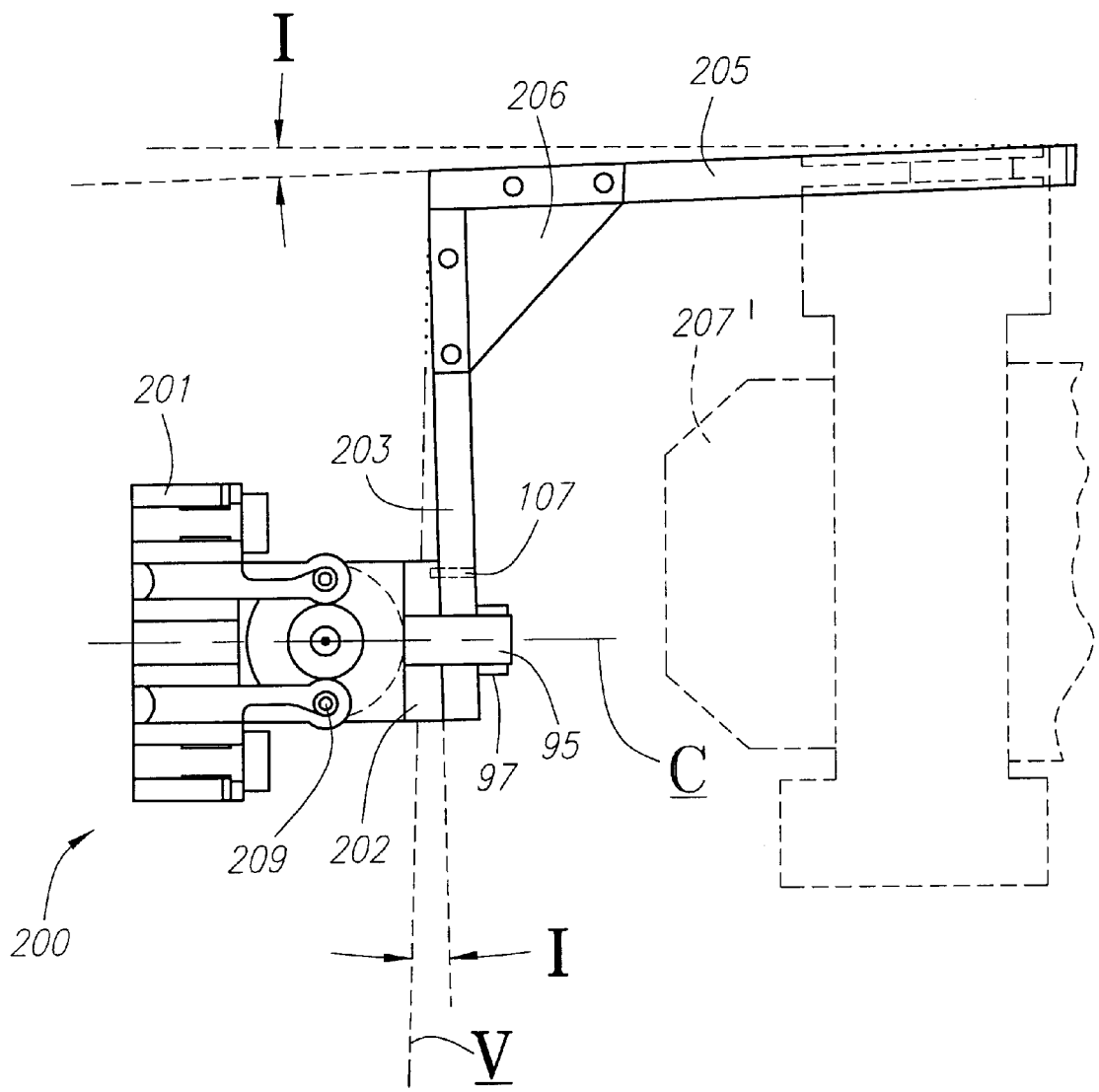
FIG. 13 is a side view of an alternative embodiment of the nose piece shown in FIGS. 1 and 8.

FIG. 13 shows an alternative embodiment crane arm 200 having a nose or camera platforms section 201 which provides for improved leveling of the camera, when the camera is mounted on the assembled and balanced arm 200. As shown in FIG. 13, the nose section 201 has armature 80 and an attaching plate 202 with an upwardly inclined end face pivotably attached to the armature 80. The line V in FIG. 13 represents the vertical direction. The end face of the attaching plate 202 is at an inclined angle, preferably in the range of 1–3 degrees, and preferably 2 degrees in the embodiment shown. The inclined angle extends to the rear of the crane arm, above the crane arm centerline, so that the camera platform or nose plate is tilted backwards, or in a counterclockwise direction. In other words, the front of the platform is elevated above the back of the platform.

As shown ins FIG. 13, the top plate or camera support plate 205 of the nose section 201 is preferably attached at 90 degrees to the side plate 203 of the nose section 201. A gusset 206 braces the top and side plates 205 and 203 at right angles. As the side plate 203 is clamped flush against the inclined end face of the attaching plate 202, via the stud 95 and the nut 97, and locked into a straight up angular position via the dowel pin 107, the side plate is angled rearwardly at angle I. Correspondingly, the top plate 205 is also inclined rearwardly at angle I.

In use, for most filming sequences, the camera 207 (and specifically the camera lens) must be level or horizontal. With the camera 207 attached to the nose section 201 by itself, the camera would be looking up at angle I, instead of being level. However, when the nose section is attached to an assembled camera crane arm, as shown e.g., in FIG. 1, and with the arm balanced using counterweights in the weight bucket 24, the leveling rods 64 and 65 deflect. The upper leveling rods 64, in all of the crane arm sections, stretch under the tensile stress of the camera and counterweights. Similarly, the lower leveling rods 65, in all of the crane arm sections, compress, under an equivalent compressive stress. For a smaller camera crane, of the type shown in FIG. 1, having relatively small leveling rods which are closely spaced together, the deflection can be significant. This deflection of the leveling rods causes the camera support plate 205 to rotate slightly clockwise, typically about 2 degrees. Thus, with the built in incline of the plate 205 in the unloaded condition, the plate moves into a horizontal, or very near horizontal position, when the camera crane arm in loaded and put into use. Consequently, a separate camera leveling head is not needed on the plate 205. If the mobile base on which the crane is mounted is level, the camera will also be level. This reduces the set up time of the camera on the arm, and the need to provide a leveling head.

The preferred 2 degree incline angle is selected based on a median expected number of arm sections and on a median camera payload weight. The incline angle can be adjusted for variations in arm length and/or camera payload weight. To help reduce deflection of the leveling rods 64 and 65, expanding quick release pins 209, similar to the pins 78 described above, are used, to take play out of the leveling rod linkages, when the arm is assembled.

Referring still to FIG. 13, the height of the side plate 203 is selected so that the center of gravity of the camera 207 is at or near the centerline C of the crane arm. Alternatively, the side plate 203 can have several vertically spaced apart holes, so that use of one of the holes will locate the center of gravity of the camera at or near the arm centerline. Having the camera closer to the crane arm centerline, in contrast to the embodiment shown in FIG. 1, reduces twisting or torquing of the arm, especially during rapid arm movements. The crane arm therefore provides more stable support for the camera.

With the camera positioned more centrally relative to the crane arm, crane operation is also improved. For example, if the crane must be maneuvered to move the camera through a window or other opening, there is more clearance around the camera, in all directions. The cross section of camera and crane arm is reduced, as the crane arm falls entirely within the cross section of the camera. This provides greater flexibility of camera movement.

Thus, a novel camera crane arm and camera crane arm section having been shown and described. Many changes and modifications can of course be made without departing from the spirit and scope of the invention. The invention, therefore, should not be restricted, except by the following claims.

I claim:

1. A camera crane arm comprising:
   a camera crane section;
   a pair of leveling rods pivotably supported on the camera crane section;
   a nose section attached to the camera crane section and comprising:
      an armature joined to an end of the camera crane section;
      an attaching plate pivotably supported on the armature; and
      a camera support plate supported on the attaching plate and extending at an incline angle relative to the camera crane section, when the camera crane arm is not loaded with a camera.

2. The camera crane arm of claim 1 wherein the incline angle is 1–3 degrees.

3. The camera crane arm of claim 2 wherein the incline angle is 2 degrees.

4. The camera crane arm of claim 1 with the camera support plate supported on the attaching plate via a side plate perpendicular to the camera support plate.

5. The camera crane arm of claim 1 further including a side plate joined at the incline angle to the camera support plate, and with the armature having an end face perpendicular to the camera crane section, with the side plate joined flush against the end face.

6. The camera crane arm of claim 5 wherein the incline angle is 91–93 degrees.

7. A camera crane arm comprising:
   a camera crane section having an upper surface and a lower surface;
   a leveling rod pivotably supported on the camera crane section;
   a nose section attached to the camera crane section and comprising:
      an armature joined to an end of the camera crane section;

an attaching plate pivotably supported on the armature; and a camera support plate supported on the attaching plate, and with the camera support plate not parallel and not co-planer with the upper surface of the camera crane section.

8. A camera crane arm, comprising:

a crane section;

an armature fixed onto the crane section a nose plate pivotably attached to the armature;

a pair of leveling rods pivotably attached to the crane section and to the nose plate; and with the nose plate extending towards the crane section at an angle of from 1°–3°.

* * * * *